Patented Aug. 22, 1933

1,923,618

UNITED STATES PATENT OFFICE 1,923,618

PREPARATION OF AMINO DERIVATIVES OF THE ANTHRAQUINONE SERIES

Philip H. Groggins, Washington, D. C., dedicated to the free use of the public, of and within The United States of America No Drawing. Application July 30, 1932
Serial No. 627,116

13 Claims. (Cl. 260—60)

(Granted under the Act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without payment to me of any royalty thereon.

I hereby dedicate the invention herein described, to the free use of the public, of and within the United States of America, to take effect upon the granting of a patent to me.

This invention relates to the preparation of carbon compounds and more particularly to the preparation of amino derivatives of the anthraquinone series. It especially contemplates the ammonolysis of halogeno anthraquinones.

The invention has for an object the preparation of amino-anthraquinones by new chemical processes.

Other objects are the preparation of these compounds in a very pure state in high yields, by processes which are simple and which may be readily carried out, and which are beyond the purview of my co-pending application for patent, Serial No. 548,043, filed June 30, 1931, which points out the advantage of using chlorates and nitrates as oxidants.

These objects are accomplished by the heating of halogeno-anthraquinones with strong aqueous solutions of ammonia under pressure in the presence of oxyhalogen compounds. The invention also contemplates the optional use of a catalyst or an alkali metal nitrate.

The invention will be further understood from a consideration of the following examples, in which the parts are given by weight:

EXAMPLE I

*Preparation of beta-amino-anthraquinone*

In a suitable high pressure autoclave there was placed 36.5 parts of 2-chloro-anthraquinone, .72 parts of cupric nitrate, and 1.6 parts of potassium iodate. Thereafter 315 parts of 28% aqueous ammonia were added and the autoclave closed. The charge was heated to gradually raise the temperature to 195° C. This temperature was maintained for approximately 24 hours, after which the reaction mass was filtered and the solid material washed free from the mother liquor. 2-amino-anthraquinone of 97.5% purity was obtained. The yield was 95% of the theoretical.

EXAMPLE II

*Preparation of beta-amino-anthraquinone*

To a mixture of 36.5 parts of beta-chloroanthraquinone, 2 parts of ammonium nitrate, 2 parts of sodium bromate in an autoclave there was added 320 parts of 30% aqueous ammonia. After closing the autoclave the resultant mixture was heated in such a manner that the temperature was gradually raised to 195° C. This temperature was maintained for twenty-four hours. The reaction mass was thereafter transferred to a distillation apparatus, made alkaline with sodium hydroxide, and the excess of ammonia recovered by distillation. The residue remaining in the still was thereafter filtered and washed free from the mother liquor. The solid product obtained was beta-amino-anthraquinone having a purity of 96%. The yield was 96% of that theoretically possible. The amino compound gave a clear diazonium salt solution.

EXAMPLE III

*Preparation of alpha-amino-anthraquinone*

Alpha-chloro-anthraquinone was treated by the process set out in Example II with equally desirable results.

The invention is not limited to the exact details given in the above examples. In general the various chlorine substituted anthraquinone derivatives may be used satisfactorily. The results obtainable by using as starting substances such compounds as 1-nitro-5-chloro-anthraquinone, 1-nitro-6-chloro-anthraquinone, 1-nitro-7-chloro-anthraquinone, 1 - nitro - 8-chloro-anthraquinone, beta-chloro-anthraquinone, alpha-chloro-anthraquinone, 1:5 - di - chloro - anthraquinone, 1:8-di - chloro - anthraquinone, 2:6-di-chloro-anthraquinone, 2:7 - di - chloro-anthraquinone and the various nitro-di-chloro-anthraquinones, merit special mention.

The temperatures at which the processes of this invention are carried out, as will be obvious to one skilled in the art, depend upon the particular starting compound and the other ingredients of the reaction mass. In general the preferred temperature range is between 150° C. and 225° C.

In carrying out my process any inorganic oxyhalogen compound may be used. This class comprises the salts of hydrochlorous acid HOCl, perchloric acid $HClO_4$, and chloric acid $HClO_3$ as well as the corresponding iodine, bromine, and fluorine compounds. It further contemplates the use of the halogen gases since these react to form hypohalogen compounds with aqueous ammonia.

Because of its availability, alkali metal chlorates are generally used, but it is to be understood that the corresponding salts of other inorganic halides such as iodates, bromates, etc. give equivalent results.

In the examples ammonium nitrate has been use. This may be replaced with other alkali metal nitrates, for example, sodium nitrate.

The strength of the aqueous ammonium solution may be varied, but preferably the concentration is that corresponding to a 20 to 50% ammonia ($NH_3$) content. With decreasing concentration of the ammonia solution increasing temperatures may be used advantageously.

In general, for a given concentration of ammonia the use of higher temperatures results in completion of the reaction in a shorter time.

This invention is applicable to halogeno-anthraquinones in general. Bromo-anthraquinones also give very desirable results.

The invention is not limited to the use of metallic copper nor any particular copper salt as a catalyst. Other metals or metal salts, for instance, the salts of the metals or the metals themselves which follow copper in the electromotive series are used advantageously. Special mention may be made of copper nitrate, cupric oxide and silver chloride.

By the term "reduced copper" it is intended to cover metallic copper in any physical form, preferably precipitated copper in the form of a fine copper powder or sponge.

Throughout the specification and claims where the term "alkali metal" is used it is intended to cover the ammonium radical ($NH_4$)—, because it reacts similarly to the corresponding sodium and potassium compounds.

The process of this invention has several very important and distinct advantages over any other processes known to the prior art. Among these may be mentioned the fact that the yields of amino-anthraquinones obtained are substantially theoretical, the products of the process are so pure as to render unnecessary special or additional purification steps, the processes may be carried out at lower temperatures than heretofore deemed possible, and the quantities of materials per charge can be greatly increased in proportion to the ammonia content of the autoclave. This last mentioned advantage is of particular importance in commercial processes.

As many apparently widely different embodiments of this invention may be made without departing from the spirit and scope thereof, it is to be understood that I do not limit myself to the specific embodiments thereof except as defined in the appended claims.

I claim:

1. A process which comprises heating halogeno-anthraquinone with aqueous ammonia in an autoclave under pressure in the presence of an oxyhalogen compound and ammonium nitrate at a temperature of 150° C. to 225° C.

2. The process which comprises heating a halogeno-anthraqinone with aqueous ammonia in an autoclave under pressure in the presence of an oxyhalogen compound.

3. The process which comprises heating a chloro-anthraquinone with aqueous ammonia under pressure in the presence of an inorganic oxyhalogen compound.

4. The process which comprises heating a halogeno-anthraquinone with aqueous ammonia under pressure in the presence of an inorganic nitrate and an inorganic iodate.

5. The process which comprises heating a halogeno-anthraquinone with aqueous ammonia under pressure in the presence of an alkali metal nitrate and an alkali metal bromate.

6. The process which comprises heating a chloro-anthraquinone with aqueous ammonia under pressure in the presence of an oxyhalogen compound which is soluble in aqueous ammonia.

7. The process which comprises heating a chloro-anthraquinone with aqueous ammonia under pressure in the presence of an alkali metal nitrate and an oxyhalogen salt which is soluble in aqueous ammonia.

8. The process which comprises heating a bromo-anthraquinone with aqueous ammonia under pressure in the presence of ammonium nitrate and an oxyhalogen compound.

9. The process which comprises heating a halogeno-anthraquinone with aqueous ammonia under pressure in the presence of an oxyhalogen compound which is soluble in aqueous ammonia and a metal following hydrogen in the electrochemical series.

10. The process which comprises heating a chloro-anthraquinone with aqueous ammonia under pressure in the presence of an oxyhalogen compound, and a copper containing catalyst.

11. The process which comprises heating a halogeno-anthraquinone with aqueous ammonia under pressure in the presence of an inorganic nitrate, an oxyhalogen compound, and a copper containing catalyst.

12. The process which comprises heating a halogeno-anthraquinone with aqueous ammonia under pressure in the presence of cupric nitrate, and an oxyhalogen compound.

13. The process which comprises heating a bromo-anthraquinone with aqueous ammonia in a pressure system in the presence of an organic nitrate, an oxyhalogen compound, and a copper containing catalyst.

PHILIP H. GROGGINS.